United States Patent
Jarvinen et al.

(10) Patent No.: US 6,470,470 B2
(45) Date of Patent: *Oct. 22, 2002

(54) INFORMATION CODING METHOD AND DEVICES UTILIZING ERROR CORRECTION AND ERROR DETECTION

(75) Inventors: Kari Jarvinen, Tampere (FI); Matti Kajala, Tampere (FI); Janne Vainio, Saaksjarvi (FI)

(73) Assignee: Nokia Mobile Phones Limited, Espoo (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/019,656

(22) Filed: Feb. 6, 1998

(65) Prior Publication Data
US 2002/0035713 A1 Mar. 21, 2002

(30) Foreign Application Priority Data
Feb. 7, 1997 (FI) .................................................. 970554

(51) Int. Cl.⁷ ............................................. H03M 13/00
(52) U.S. Cl. ...................................... 714/755; 714/758
(58) Field of Search ................................ 714/746, 758, 714/704, 755; 358/133; 341/95; 375/299, 346; 370/337

(56) References Cited

U.S. PATENT DOCUMENTS

| | | | |
|---|---|---|---|
| 5,115,469 A | 5/1992 | Taniguchi et al. | 381/36 |
| 5,243,419 A * | 9/1993 | Faryar et al. | 358/133 |
| 5,243,629 A * | 9/1993 | Wei | 375/299 |
| 5,245,339 A * | 9/1993 | Cideciyan | 341/95 |
| 5,251,237 A * | 10/1993 | Baier | 375/346 |
| 5,491,719 A * | 2/1996 | Sellin et al. | 375/213 |
| 5,553,080 A * | 9/1996 | Fujiwara | 714/704 |
| 5,557,639 A | 9/1996 | Heikkila et al. | 375/224 |
| 5,675,372 A * | 10/1997 | Aguayo et al. | 348/12 |
| 5,675,972 A * | 10/1997 | Aguayo et al. | 348/12 |
| 5,701,390 A * | 12/1997 | Griffin et al. | 395/2.15 |
| 5,737,331 A * | 4/1998 | Hoppal et al. | 370/349 |
| 5,822,315 A * | 10/1998 | Seze et al. | 370/337 |
| 5,901,186 A * | 5/1999 | Jamal et al. | 375/346 |
| 6,170,073 B1 * | 1/2001 | Jarvinen et al. | 714/758 |

FOREIGN PATENT DOCUMENTS

| | | |
|---|---|---|
| EP | 0 651 531 A2 | 5/1995 |
| EP | 0 798 888 A2 | 10/1997 |
| GB | 2 291 570 A | 1/1996 |
| WO | WO 93/05502 | 3/1993 |

OTHER PUBLICATIONS

GSM recommendation 06.11 "Substitution and muting of lost frames for full–rate speech traffic channels", ETSI/GSM Jan. 1991.
GSM recommendation 06.10 "GSM full rate speech transcoding", ETSI/GSM Jan. 1991.
PCT International Search Report.

* cited by examiner

Primary Examiner—David Ton
(74) Attorney, Agent, or Firm—Perman & Green, LLP

(57) ABSTRACT

Focused error correction and/or focused error detection is used in the information coding system. A speech encoding method, in which the number of speech parameter bits on which error correction coding and/or error detection coding focuses is automatically adjusted in relation to the number of total speech parameter bits as a function of the quality of the information transfer connection. There is no need to reduce the number of bits used for speech encoding. Thus the voice quality of the speech remains high. The error correction and/or error detection is focused on the bits most important for the voice quality e.g., as a function of the C/I (Channel to Interference)13 parameter describing the quality of the information transfer connection. The muting of speech synthesizing occuring in prior systems on poor information transfer connection is reduced by using focused error detection.

16 Claims, 12 Drawing Sheets

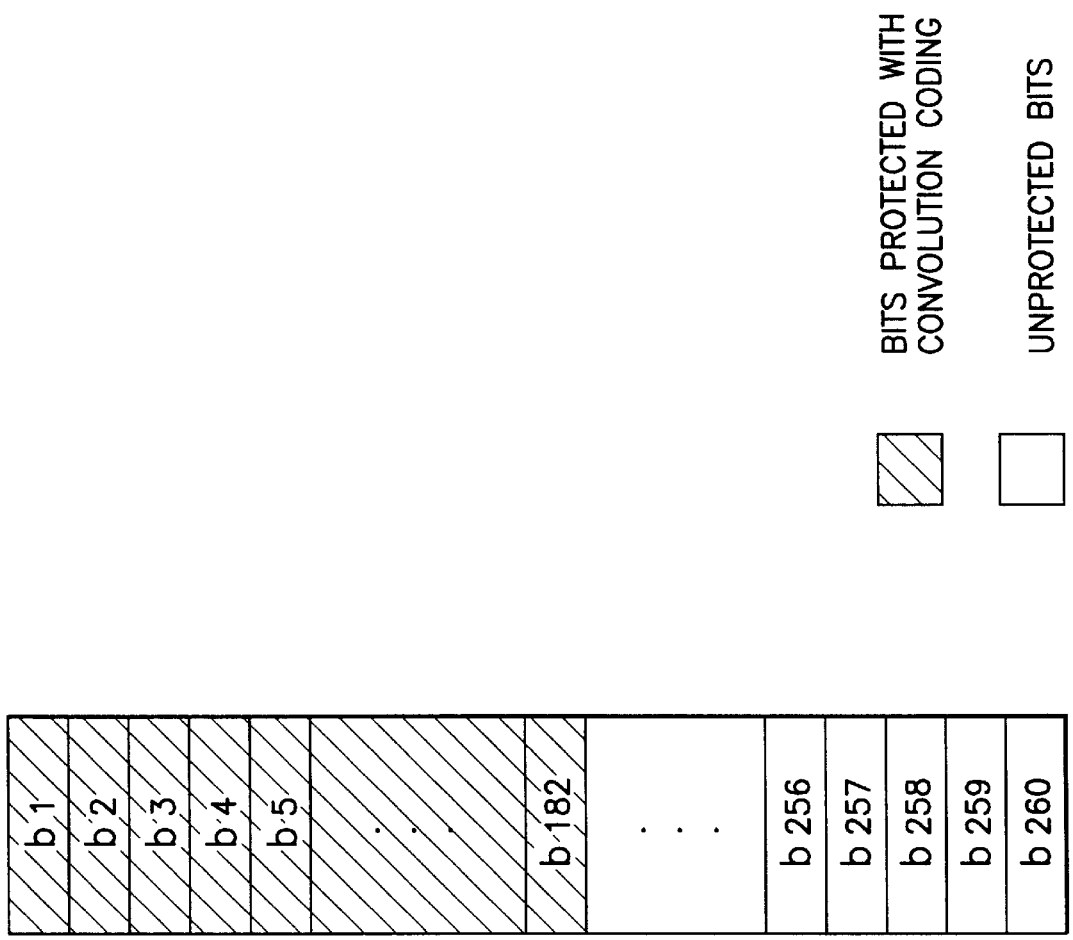

INFORMATION CODING METHOD AND DEVICES UTILIZING ERROR CORRECTION AND ERROR DETECTION

FIELD OF THE INVENTION

The present invention relates to an information coding method utilizing focused error correction and/or error detection, in which method the quality of the data transfer connection is used for selecting the coding mode for the data transfer connection. The invention also relates to a system and terminal devices applying the method. The invention is particularly suitable for use in connection with data transfer connections realized by radio.

BACKROUND OF THE INVENTION

While transferring information, such as speech or data, using transfer connections subject to transmission errors, the information to be transferred is in general protected using an error correction algorithm. Especially in digital connections an attempt is made to detect transmission errors, and to correct the erroneous information bits. How successfully this is done depends among other things on the number of transmission errors and on the error correction algorithm used. In speech coding systems prior known to a person skilled in the art, a major part of the bits comprising speech information are protected using an error correction code. This is the procedure e.g. in the so called full rate (FR, Full Rate) speech codec of the GSM system.

In the full-rate speech codec (which later is also called FR-speech codec) of the GSM system a RPE-LTP (Regular Pulse Excitation-Long term Prediction) based speech encoding system is used. It produces 260 speech parameter bits for each 20 ms speech frame. Out of these 260 bits, the 182 subjectively most important bits are protected using an error correction code. As the error correction code, ½-rate convolution encoding is used. The remaining 78 bits are transferred in the data transmission connection completely without error correction.

The number of transmission errors on a data transfer connection may temporarily exceed the error correction capacity of the ½-rate convolution coding used in the GSM-system. As a result, the important received speech parameter bits may contain transmission errors. It is important to detect that these transmission errors occurred, even if it were not possible to correct them. If the speech parameters which are the most important for speech quality contain transmission errors, they shall not be used for speech synthesizing in the receiver, but they must be rejected. In the full rate FR-speech codec of the GSM-system 3-bit CRC (Cyclic Redundancy Check)-error detection is used. CRC-error detection is focused on the 50 most important bits of speech coding. In a receiver the error detection code is used for verifying the correctness of the 50 most important bits of each 20 ms speech frame. If they contain errors, the frame is classified as bad and it is not used in speech synthesizing. Instead, an attempt is made to substitute the bad frame with an estimate, which is formed e.g. based upon chronologically preceding error-free frames.

The full-rate speech coding method of the GSM-system briefly presented above, operates reasonably well, provided that the relative share of transmission errors does not grow too high. Under these conditions the error correction algorithm is capable of correcting transmission errors sufficiently for obtaining a satisfactory transfer connection and through it a satisfactory speech quality. When the proportion of transmission errors grows to medium or high level, the error correcting capability of convolution coding having ½-rate coding ratio is exceeded. In this case a more efficient error correction algorithm would be needed, such as e.g. a convolution coding having ⅓-rate coding ratio. In this case, however, the total speech encoding efficiency will be reduced essentially, because more error correction information bits must be included in the data transfer connection. This naturally increases the data transfer rate required of the data transfer connection. Accordingly, this approach cannot be used for codecs with fixed line speed. Instead, the above presented method based upon making the error correction algorithm more efficient is suitable for systems with variable line speed.

For instance, the total bit rate of the data transfer system used for transferring speech can be kept constant, provided that at the same time when the number of bits used for the error correction of speech parameter bits is increased, the number of bits used for speech encoding itself is reduced. This in turn requires using several different speech codecs with different line speeds in both the transmitter and the receiver, which makes the structure of the system more complicated. Further, the lower the number of bits used for speech encoding, the more calculation capacity is normally required of the various components of the system. The above presented disadvantages increase the cost of the system. In addition to the above, the deterioration of speech quality cannot be avoided when more bits are used for error correction, because the fewer bits there are available for speech encoding, the more one has to compromise the voice quality. The voice quality deterioration due to the reduction of the number of bits used for speech encoding is particularly important in a case where there is background noise to speech, e.g. the noise from a car engine.

One problem occurring in speech coding methods according to prior art is the complete muting of the speech synthesizing in a receiver when data transfer connections containing a large number of transfer errors are used. This is due to the fact that when an error detection algorithm detects transfer errors in speech frames, it too easily mutes the speech synthesizer. This leads to the loss of speech information.

As is evident from the above description, there is a need to develop a better method of protecting information parameters on data transfer connections containing numerous transfer errors. In addition, there is a need to develop a system, the receiver of which better tolerates information parameter frames containing errors. In the following the information coding method according to the invention and the system utilizing it and the terminal devices are explained primarily using the speech coding in a mobile communication system as an example. Nothing however limits using the information coding system according to the invention for coding of data other than speech data. For the sake of clarity the invention is in the following also called a speech coding method, because it best describes one of the most important fields of application of the invention. It is possible to utilize the invention instead of a radio connection, also e.g. in connection with information transfer systems realized using wireline connections.

SUMMARY OF THE INVENTION

Now an information coding method utilizing focused error correction and error detection system has been invented, by use of which the above described problems can be reduced. One of the purposes of the present invention is to present a speech coding method which will be automatically adjusted as a function of the quality of a data transfer connection optimizing the speech quality on data transfer connections of any quality. The quality of the data transfer connection used is analyzed by measuring the parameters describing the quality of a data transfer connection, such as e.g. C/I (Carrier to Interference) ratio, S/N (Signal to Noise) ratio or bit error rate (Bit Error Rate, BER) as known to a person skilled in the art. In the information coding method according to the invention there is no need to reduce the number of bits used for speech coding in relation to the total bit rate used in the information transfer connection, in which case the voice quality of the speech preferably remains good. In the information coding method according to the invention error correction and/or error detection is focused on the bits most essential for voice quality as a function of the C/I-ratio or of some other parameter describing the quality of the data transfer connection. The muting of speech synthesizing occurring in prior art systems on data transfer connections of poor quality is reduced in the information coding method according to the invention by using the focused error detection, in other words using focused detection of bad frames.

The information coding method according to the invention tolerates data transfer errors well. The high tolerance of data transfer errors has been achieved by monitoring the quality of a data transfer connection, and by optimizing the focusing of the error correction and error detection of speech parameters. Both the error correction coding (e.g. convolution coding) and the error detection coding (e.g. checking of the cyclic redundancy) are adjusted to match the error conditions of the data transfer connection.

When few data transfer errors occur, all or almost all speech parameter bits are protected with an error correction code in a system according to the invention. When more data transfer errors occur, the error correction is focused more on the speech parameter bits most important for speech quality and intelligibility (when data other than speech is transferred, on the most important bits for the information). Alternatively, or additionally, when few data transfer errors occur, all or almost all speech parameter bits are protected with an error detection code in a system according to the invention, and when more data transfer errors occur, the error detection is focused more on the speech parameter bits most important for speech quality and intelligibility. The focusing of error detection bits can be done by keeping the number of error detection bits constant (e.g. 3 CRC bits) but performing error detection on a different amount of information bits depending on data transfer quality. The focusing of error detection bits can be done by varying the number of error detection bits depending on data transfer quality. Which bits that are the most important for speech quality is determined based upon the speech coding method used. For example, when a simple PCM (Pulse Code Modulation) coding is used, it is unambiguous that the most significant bits (MSB, Most Significant Bits) are more important and they must be protected carefully. The least significant bits (LSB, Least Significant Bits) can be left unprotected if needed, because their effect on the intelligibility of speech is small. In the FR-speech codec of the GSM-system, known to a person skilled in the art, the relative significance of the bits has been defined in the GSM-specification. The final decision of which bits are the most important for speech quality has been made subjectively, based upon listening tests. When in the method according to the invention, the error detection code is focused on the most important bits, the error correction code is at the same time changed to be more efficient, or more error correction information is included in relation to protected speech parameter bits. This is realized e.g. by using a convolution coding having a lower coding ratio.

When the quality of an information transfer connection becomes poor, as happens in a mobile communication system when the quality of a radio connection between a mobile station and a base station deteriorates, in a system according to the invention a smaller and smaller part of all speech parameter bits is protected selectively, but using an enhanced error correction code. The error correction coding is focused on the bits most important for speech quality in such a way that the most important bits are always protected and the less important bits are protected within the limits set by the quality of the information transfer connection and the number of bits available for error correction allow. As a result of the enhancement of the error correcting code, it is possible to decode speech in the receiving end even on information transfer connections containing numerous of errors, in other words, a system utilizing the speech coding method according to the invention will not "collapse", i.e., the output of the speech decoder is not muted. Bits transferred without the error correction code may reduce the speech quality due to transmission errors, but well protected, most important speech parameter bits still guarantee the intelligibility of the speech. As to speech quality, this method is far better than trying to protect all speech parameter bits or a major part of them using a poor error correction code. A poor error correction code on information transfer connections with plenty of interference results in a situation, in which the error correction code no longer is capable of correcting the transmission errors. In this case actually all bits used for error correction have been wasted. When the quality of the information transfer connection improves, or the number of transmission errors is reduced, the speech coding method according to the invention adapts itself correspondingly to the new situation and increases the share of speech parameter bits protected with the error correction code. Thus the error correction operates efficiently in all data transfer conditions.

It is possible to analyze the quality of an information transfer connection using a number of methods. Among the methods are the above mentioned ones known to a person skilled in the art, C/I (Channel to Interference)- and S/N (Signal to Noise)-ratios measured in an information transfer connection. It is possible to analyze the quality of an information transfer connection in a receiver also as a function of the frequency of occurrence of speech parameter frames rejected in the speech synthesizing due to errors contained in the most important bits, as it is explained below in more detail in connection with an embodiment of the invention. It is possible to perform the detection of the quality of an information transfer connection itself in both a transmitter and a receiver, but the information about the selected speech coding mode (or how the error correction and/or error detection bits are focused according to the invention) must always be transferred to the speech encoder of the transmitter.

A system according to the invention typically uses the same speech codec operating at a fixed line speed. Only the focusing of error correction coding and error detection coding is adapted to correspond with the current data transfer conditions. This facilitates the operation of the system above a "collapse point". A collapse point means a situation in which a data transfer connection contains so many data transfer errors that a receiver no longer is capable of interpreting the received information. In other words, an information coding method utilizing the focused error correction and error detection according to the invention lowers the collapse point of a data transfer connection, which in practice means e.g. that a data transfer connection between a mobile station and a base station can be successfully established on radio connections with poorer Signal to Noise-ratios than previously.

A system utilizing the speech coding method according to the invention is automatically adapted according to the current data transfer conditions, and thus minimizes the effect of data transfer errors on the speech quality. Because the focusing of the error correction code on certain speech bits is a part of the error correction code itself, it is possible to realize, utilizing the invention, such a system operating at fixed line speed, which provides high speech quality. It is possible to use the invention on all kinds of data transfer connections without a need to go over to using a codec with a lower line speed. In such data transfer systems which use variable line speed or which change the ratio between speech parameter bits and error correction information, the invention can equally be utilized for improving the data transfer connection and through it the speech quality.

In addition to that in the speech coding method according to the invention the error correction code is focused in relation to the most important speech parameter bits, also the error detection code (for example CRC) is focused more to protect the most important speech parameter bits, the more data transfer errors the current data transfer connection contains. This further improves the probability of the information coming through and reduces the need to mute the speech signal in the receiver. This preferably improves the speech quality and intelligibility. When data transfer connections containing a very large number of data transfer errors are used, it is possible to accept data transfer errors in the less important bits of the speech frames and to use these speech frames for synthesizing speech in the receiver, because the quality of the speech is reduced anyhow if there has been a need to reject speech frames due to errors in the most important bits of the speech frames.

According to a first aspect of the invention there is provided a digital information transfer system, which comprises a transmitter and a receiver and an information transfer connection between said transmitter and receiver, said transmitter and receiver comprise means for the processing of information and for transferring it from said transmitter to said receiver using said information transfer connection, said transmitter comprises a channel encoder for processing the information, said information processing means comprise first dividing means for dividing the information into at least two parts, a first part and a second part, and that to said information of the first part in said channel encoder one of the following operations is performed: error correction coding for the correction of transfer errors occurring on the information transfer connection at reception, error detection coding for the detection of transfer errors occurring on the information transfer connection at reception, and a combination of them, the system being characterized in that it comprises means for analyzing the quality of said information transfer connection and for yielding a response describing the quality, and that said transmitter has been arranged to adjust the ratio between said first information and said second information based upon the response received from said information transfer connection quality analysis means.

According to a second aspect of the invention there is provided a mobile station comprising a transmitter and a receiver, said transmitter and receiver comprise means for processing the information, said transmitter comprises a channel encoder for processing the information, said information processing means comprise first dividing means for dividing the information into at least two parts, a first part and a second part, and that one of the following operations is performed in said channel encoder on said information of the first part: error correction coding for the correction at reception of transfer errors which occur in the information transfer connection, error detection coding for the correction at reception of transfer errors which occur in the information transfer connection, and a combination of them, the mobile station being characterized in that it comprises means for analyzing the quality of said information transfer connection and for yielding a response describing the quality, and that said transmitter has been arranged to adjust the ratio between said first information and said second information based upon the response received from said information transfer connection quality analyzing means.

According to a third aspect of the invention there is provided a transmitter comprising means for processing information and transferring it to an information transfer connection, said transmitter comprises a channel encoder for processing the information, said information processing means comprise a first dividing means for dividing the information into at least two parts, a first part and a second part and that one of the following operations is performed on said information of the first part in said channel encoder: error correction encoding for the correction at reception of transfer errors occurring in the information transfer connection, error detection encoding for the detection at reception of transfer errors occurring in the information transfer connection, and a combination of them, the transmitter being characterized in that it comprises means for analyzing the quality of said the information transfer connection and for yielding a response describing the quality, and that said transmitter has been arranged to adjust the ratio between said first information and said second information based upon the response received from said information transfer connection quality analyzing means.

According to a fourth aspect of the invention there is provided a receiver comprising means for receiving information from a transmitter over an information transfer connection, and a channel decoder for performing one of channel decoding operations on the information received from the information transfer connection, the receiver being characterized in that it comprises means for analyzing the quality of said information transfer connection and for forming a response based upon the performed analysis, means for determining the focused channel encoding mode to be used in said information transfer connection based upon said response, and means for transferring said channel encoding mode to the transmitter using said information transfer connection.

According to a fifth aspect of the invention there is provided a method for transferring information in a digital information transfer system, in which
the information to be transferred is divided for transmission into at least two parts, a first part and a second part,
on said information of the first part one of channel encoding operations is performed, the method being characterized in that
prior to the channel coding the quality of an information transfer connection is analyzed in order to form an analysis result, and
the ratio between said first part and second part is adjusted based upon said analysis result.

BRIEF DESCRIPTION OF THE DRAWINGS

The information coding method utilizing focused error correction and focused error detection according to the invention and its realization are explained in detail in the following, using speech coding as an example, with reference to enclosed figures, of which FIG. 1C presents the focusing of convolution coding on the most important speech parameter bits within a speech frame in the GSM-system.

DETAILED DESCRIPTION OF THE INVENTION

Figure 1A:
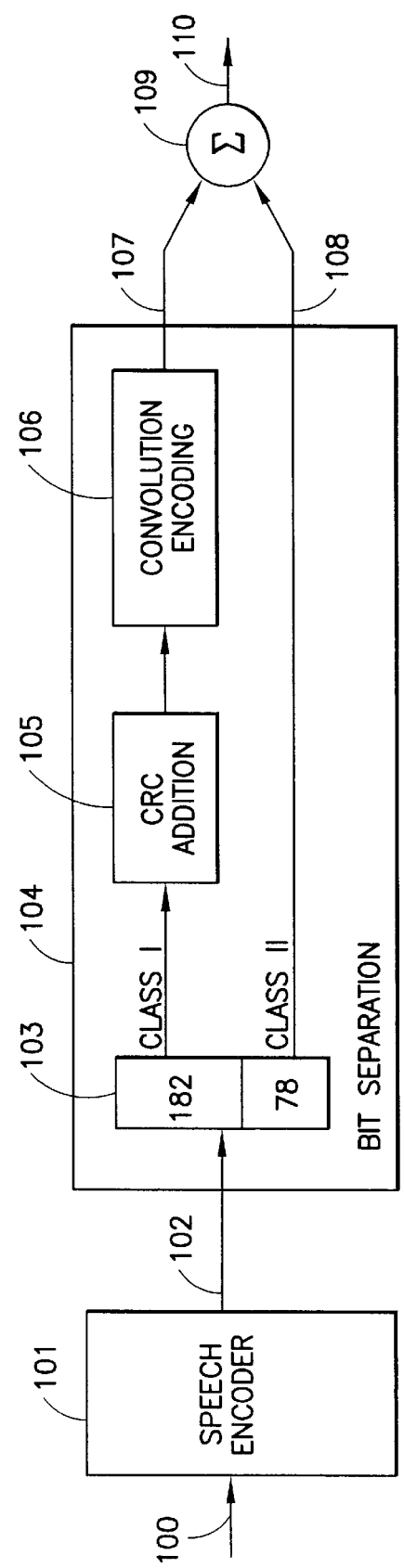
FIG. 1A presents in form of a block diagram a speech encoder prior known to a person skilled in the art, and error detection and error correction parameters included in the data flow in connection with it.

FIG. 1A presents as a block diagram the structure and function of the transmitter of an FR-speech codec prior known from the GSM-system. Speech signal 100 is coded in speech encoder 101 into speech parameters 102, which are further transferred to channel encoder 104. Channel encoder 104 adds the error correction- and error detection bits in connection with speech parameters 102. In bit separation block 103 the speech parameters are divided into two importance classes. Error detection- and error correction parameters are formed for the most important 182 bits (Class I). At first 3-bit CRC-error detection parameters are calculated in block 105 for the 50 most important bits, after which the generated bit stream (182+3 bits) is directed to convolution encoder 106. Convolution encoder 106 calculates for the bits a ½-rate convolution code with four tail bits. The result is 378 bits (2*182+2*4+2*3) of convolution coded data 107. Convolution coded data 107 is directed further to multiplexer 109, in which it is combined with the least important 78 bits (Class II, ref. 108). In all channel encoder 104 produces to the output (ref. 110) 456 bits for each 20 ms speech frame, so that the total line speed of the FR-speech codec in the GSM-system comes to 22.8 kbps.

Figure 1B:
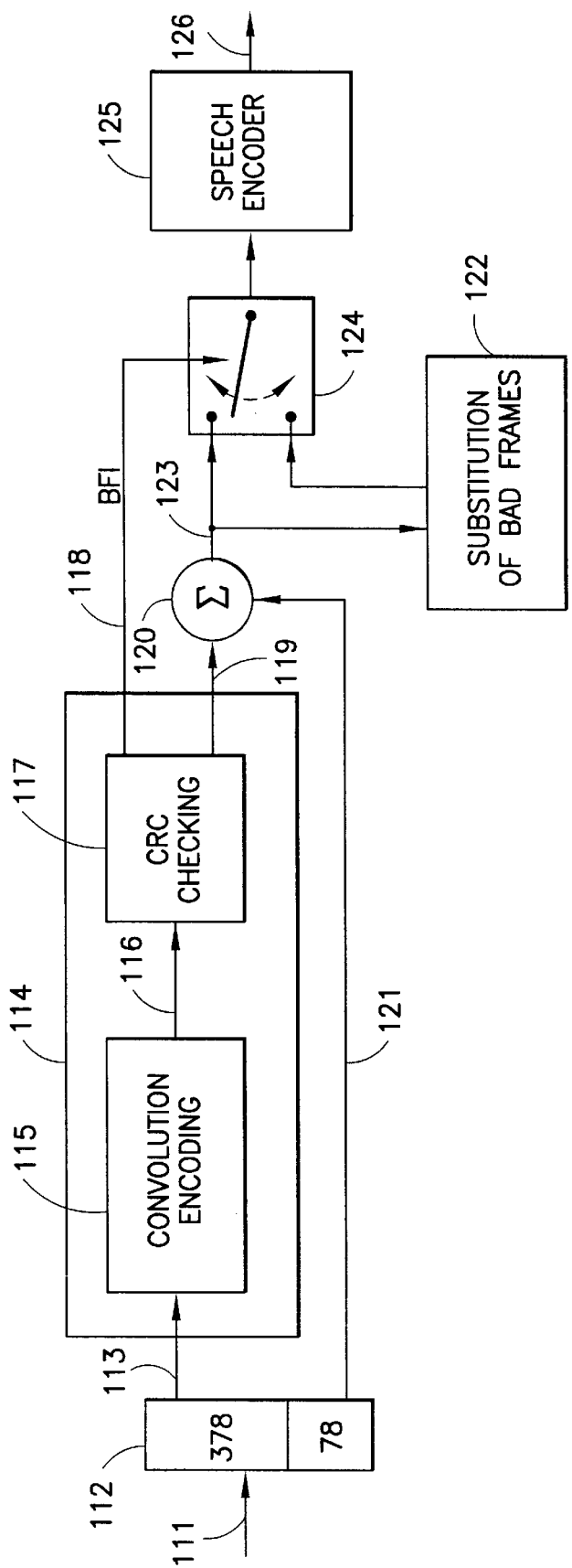
FIG. 1B presents in form of a block diagram a speech decoder corresponding with the speech encoder presented in FIG. 1A and functional blocks, prior known to a person skilled in the art.

FIG. 1B presents an arrangement, prior known to a person skilled in the art, for speech and channel code decoding in a digital receiver, such as e.g. in a receiver in the GSM-system. Channel encoded signal 111 received from the information transfer connection is in demultiplexer 112 divided into two parts: into 78 unprotected speech parameter bits (ref. 121) and into 378 bits (ref. 113) produced by convolution encoder 106 (FIG. 1A). The channel coding is decoded in two stages in channel decoder 114. In the first stage bits 113 protected with convolution encoding are processed in convolution decoder 115, which corrects the transfer errors it detects and removes the bits used in the error correction. In this way bit flow 116 is obtained in the output of convolution decoder 115, which bit flow consists of 182 speech parameter bits (ref. 119) and 3 CRC-bits. Based upon the CRC-bits channel decoder 114 checks in CRC-control 117, whether any erroneous bits have remained among the 50 most important bits. If there are no errors, speech parameter bits 119 are used in speech decoder 125 for generating speech signal 126. Speech parameter bits 119 and unprotected bits 121 are combined in multiplexer 120 in order to form a whole speech frame (which comprises 260 bits as mentioned earlier). If transfer errors are detected among the 50 most important bits, the speech frame is regarded bad and it is not used for speech synthesizing. Instead, in order to improve the pleasantness and intelligibility of the speech, instead of the rejected speech frames a prediction, obtained from multiplexer 120 based upon previous, error-free speech parameters, is transferred to speech decoder 125. This is performed in block 122. CRC-controller 117 controls switch 124 using bad frame indication flag 118 (Bad Frame Indication, BFI), based upon which of either speech frame 123 received from the information transfer connection or, in case of a bad frame, substituting prediction 122, is selected for the speech decoder.

FIG. 1C presents the 260 speech parameter bits of a speech frame used for full-rate speech encoding of the GSM-system. The speech parameter bits are in FIG. 1C presented in the speech encoding importance order in such a way that the subjectively most important bits are presented topmost, and the less important bits at the bottom. On a real information transfer connection the most important bits and the least important bits are interleaved in a speech frame in order to reduce the interfering effects of burst-like disturbances (several subsequent erroneous bits). The subjective importance means that in the GSM-system bits have been divided into bits more important and less important for speech quality based finally upon listening tests, even if it is possible to make a coarse classification also using other methods (e.g. the effect of erroneous bits on the S/N-ratio of the speech signal). The 182 most important bits b1–b182 (presented darkened) are always protected using ½-rate convolution coding, in addition to which the 50 most important bits are provided with a 3-bit CRC-error detection code. In this way in the GSM-system it is always the same bits that are protected with error correction parameters and error detection parameters independent of the quality of the transfer connection. The function of a full-rate speech codec used in the GSM-system has been described in detail in GSM-recommendation 06.10. It also defines the subjective importance on speech quality of the speech encoding parameters formed by the RPE-LTP-codec used.

Figure 2:
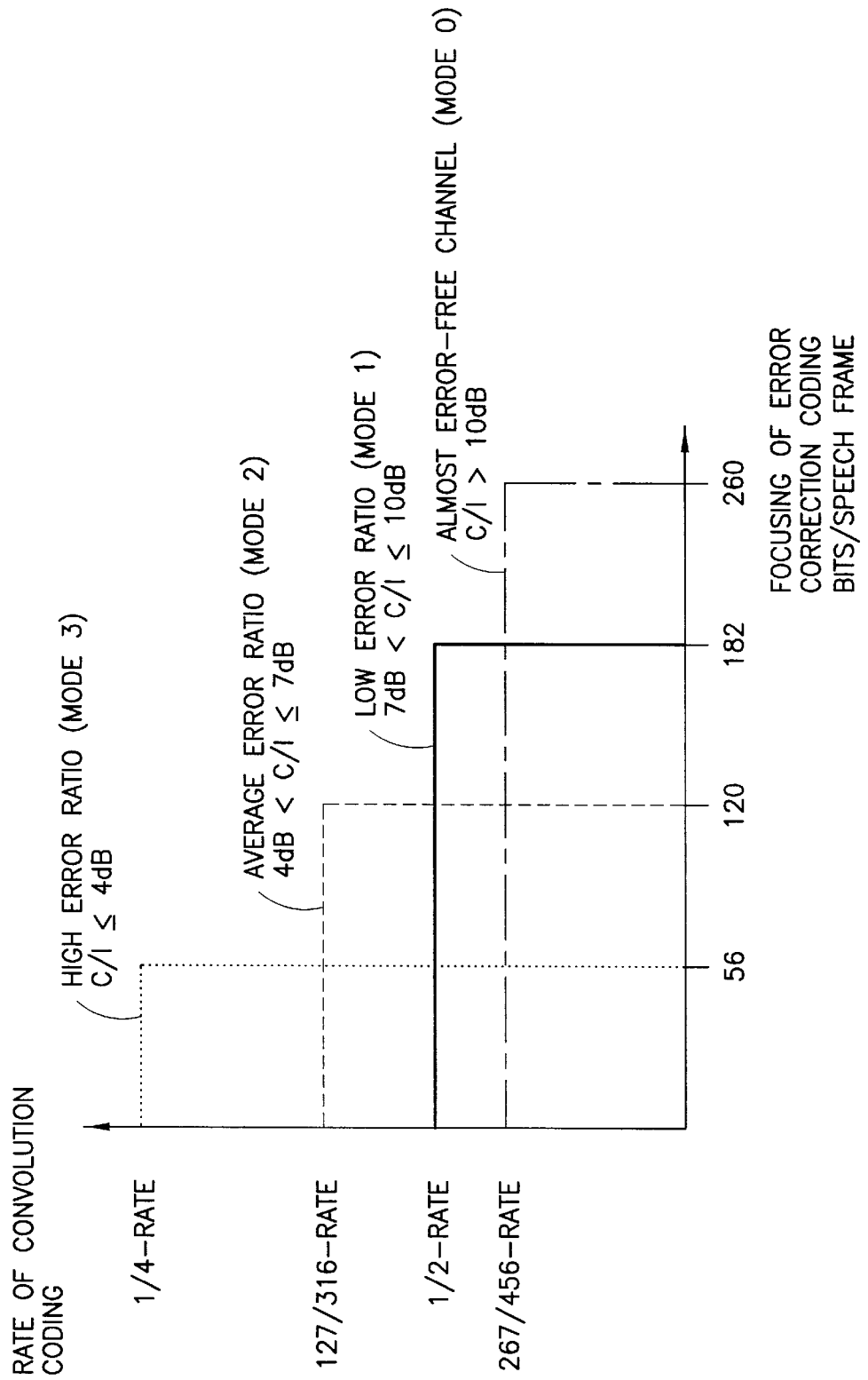
FIG. 2 presents as a diagram the ratio of convolution coding efficiency to the number of parameter bits on which error correction is focused in an information coding system according to the invention.

FIG. 2 presents a diagram describing an embodiment of the invention. It presents the efficiency of convolution coding and the focusing of it, in the way according to the invention, on a certain part of the most important information bits as a function of the error rate of the information transfer channel. The error rate of the information channel has in this example been modeled as a C/I (Carrier to Interference)-ratio. The C/I-ratio describes the quality of the received RF-signal, essentially the carrier wave signal to interference signals-ratio. The interference signals consist e.g. of the interference on the same channel caused by another base station transmitting on the same frequency, and of interference caused by adjacent channels. It would be equally possible to use for the classification e.g. signal-to-noise ratio (S/N, Signal-to-Noise, or the later explained indication based upon the number of received, rejected speech frames). Based upon the error rate of the information transfer channel, the information transfer channel is in this example classified in four different classes:

| | |
|---|---|
| almost error-free channel | (C/I > 10 dB) |
| low error ratio | (7 dB < C/I ≦ 10 dB) |
| medium error ratio | (4 dB < C/I ≦ 7 dB) |
| high error ratio | (C/I ≦ 4 dB) |

On an almost error-free information transfer channel it is possible to use an error correction code having a low error correcting capability. For example a convolution coding, the coding ratio of which is higher than ½, is sufficient to correct the errors which eventually occur in the information transfer connection. In this case there is less than one bit of error correcting information available for each speech parameter bit, but it is sufficient. When a 13.0 kbps speech codec and an information transfer channel having the transfer rate of 22.8 kbps are used, all 260 speech parameter bits of a 20 ms speech frame can be protected using 267/456-rate convolution coding with 4 tail-bits and a 3-bit CRC-code. In this way the error correction coding used increases the original number of 260 speech parameter bits (456/267) * (260+4+3)= 456 bits, exactly as required by the GSM-system used in our example.

It is possible to realize a 267/456-rate convolution code from a ½-rate convolution code by puncturing. Puncturing is a technique known to a person skilled in the art, in which it is possible to realize convolution codes with different coding ratios using the same convolution coding polynomials. Puncturing is an easily realized and flexible method, which is well suited for producing the convolution codes with different coding ratios required in the speech encoding method according to the invention. For example a 267/456-rate convolution code is obtained from a ½-rate convolution code in two stages. In the first stage 267 bits (260 speech parameter bits, 3 CRC-bits and 4 tail-bits) are encoded using the ½-rate convolution code. In the second stage, out of the obtained 534-bit convolution coded bit flow, 78 bits are dropped (punctured), in order to make it fit in a 456-bit channel frame. In this way the 267/456-rate convolution coding is obtained. In a receiver convolution decoder 222 operates synchronously with convolution encoder 209, and accordingly it knows the bit positions of the dropped bits. Convolution decoder 222 fills the absent (punctured) bit positions with a neutral value which does not present a "0" or a "1", but rather "half a bit". Having filled the absent bit positions, convolution decoder 222 has a 534-bit block, which hereafter is decoded using the ½-rate convolution code.

When the error rate of an information transfer channel becomes high enough for the channel to be interpreted as a low error rate-channel (7 dB<C/I≦10 dB), a 267/456-rate convolution code is no longer capable of correcting errors occurring in data transfer. A more efficient error correction code is required. This would correspondingly require more error correction information bits to be placed in the information transfer channel, than it is possible to place there within the system.

In the speech encoding method according to the invention a sufficiently effective error correction is obtained by focusing the error correction code on only the most important of the 260 speech parameter bits. This is realized, in this example, according to the invention using four operating modes in such a way that the focusing is the more accurate the higher the error rate of the information transfer channel is. Simultaneously the coding ratio of the error correction is adjusted correspondingly. In this example a ½-rate convolution code is used on the 182 most important bits on channels having a low error ratio, and thus the 2*(182+3+4)+78=456 bits required by the channel frame are obtained.

For medium error rate (4 dB<C/I≦7 dB) and high error rate (C/I≦4 dB) channels even more effective error correction codes are required in order to be able to correct the increased errors. For these channels, in this example of the speech encoding method according to the invention, convolution coding at rates 127/316 and ¼ is used, while correspondingly the error correction is focused on the 120 and 56 most important bits respectively. The chart below presents a summary for four different focusing modes, in addition to the information transfer channel error ratio, convolution coding ratio and the number of protec2ted bits, as well as parameters characteristic of the speech encoding system according to the invention.

| Mode | Mode 0 | Mode 1 | Mode 2 | Mode 3 |
|---|---|---|---|---|
| Channel error ratio (Alternatively S/N) | C/I > 10 dB | 7 dB < C/I ≦ 10 dB | 4 dB < C/I ≦ 7 dB | C/I ≦ 4 dB |
| Speech parameter bits in a 20 ms frame | 260 | 260 | 260 | 260 |
| Convolution coding ratio | 267/456 | 1/2 | 127/316 | 1/4 |
| The number of protected speech parameter bits | 260 | 182 | 120 | 56 |
| The number of tail bits in convolution coding | 4 | 4 | 4 | 4 |
| The number of CRC-bits | 3 | 3 | 3 | 3 |
| A: The number of the protected speech parameter bits | 267 * 456/267 = 456 | 189 * 2/1 = 378 | 127 * 316/127 = 316 | 63 * 4/1 = 252 |
| B: The number of the unprotected speech parameter bits | 0 | 78 | 140 | 204 |
| The total number of transmitted bits in a 20 ms speech frame | 456 | 456 | 456 | 456 |

Alternatively, or additionally, to using focused error correction, i.e. varying the amount of error correction protected bits (line A in the table above), a focused error detection can be used. This means that necessarily no variation in error correction is performed (or no error correction is performed at all), but error detection is focused so that when few data transfer errors occur, all or almost all speech parameter bits are protected with an error detection code in a system according to the invention, and when more data transfer errors occur, the error detection is focused more on the speech parameter bits most important for speech quality and intelligibility as more data transfer errors occur. The focusing of error detection bits can be done by keeping the number of error detection bits constant (e.g. 3 CRC bits) but performing error detection on a different number of information bits (that number could be as is presented in line A in the table above) depending on data transfer quality.

Also the number of redundant bits due to error detection and/or error correction can be varied depending on data transfer quality. For example the number of error detection bits can be varied by using 6, 5, 4 or 3 bits for CRC in modes 0–3 in the above table. In that case, the gross bit-rate (i.e., the total number of bits to be transmitted consisting of both source coding bits and error protection bits) in the system will also depend on data transfer quality. The increase in the number of CRC-bits or error correction bits can be compensated by, at the same time, reducing the source coding bit-rate. This means that, in addition to focused error correction and detection, the ratio of the number of source coding bits and error protection bits is varied in the system according to data transfer quality.

The error ratio of an information channel has in the above chart been modeled as C/I (Carrier to Interference)-ratio or signal to noise (S/N)-ratio. For the present invention, such a method of analyzing the quality of a data transfer connection is well suited, in which modeling based upon the number of received and rejected speech frames is used. This is explained in detail in the following.

The quality of a data transfer connection can be estimated based upon the number of received, rejected speech frames. The estimate is based upon the number of received, rejected speech frames within a time unit. It is for example possible to monitor the number of received, rejected speech frames during the last two seconds in relation to all received speech frames and to perform the classification as follows:

| | |
|---|---|
| almost error-free channel | rejected frames $\leq$ 0.3% |
| low error rate | 0.3% < rejected frames $\leq$ 3% |
| medium error rate | 3% < rejected frames $\leq$ 15% |
| high error rate | rejected frames > 15%. |

The percentage of rejected speech frames of all received speech frames does not as such tell very accurately, what kind of reduction of speech quality is involved. For example in such a case, in which frequency hopping is not used in the system and in which the user of a telephone moves slowly, long local fading can occur in the transfer connection, even if the share of rejected frames as a whole is small. A method, better than that presented above, of detecting the quality of an information transfer connection is thus obtained by combining an additional detection based upon the number of subsequent received bad frames with the above presented method based directly upon the percentage of rejected frames. This additional detection is based upon the number of previously received bad frames during e.g. the last two seconds, and by using it a more robust selecting of focusing mode against occasional long fading is achieved.

In the following a quality analyzing method based upon this method is presented. In it the number of received, subsequent bad frames has been designated as P.

| | |
|---|---|
| almost error-free channel | $P \leq 1$ |
| low error rate | $1 < P \leq 3$ |
| medium error rate | $3 < P \leq 6$ |
| high error rate | $P > 6$ |

The above presented methods based upon the percentage of rejected frames and upon the number of subsequent rejected frames are preferably combined in such a way that the quality of an information transfer connection is detected using both above methods simultaneously, and the detection result which gives the lower quality is used for selecting the focusing mode according to the present method.

In prior art technique the substituting procedure for rejected frames is based upon a state machine, in which the number of subsequent rejected frames is counted directly. When several subsequent bad frames are received, due to the effect of each rejected frame moving to a one step lower state in the state machine, and the speech signal is muted more during the substituting procedure the, the lower state in the substituting procedure is used. Such a method is described e.g. in GSM recommendation 06.11 "Substitution and muting of lost frames for full-rate speech traffic channels" and in U.S. Pat. No. 5,526,366 "Speech Code Processing". In this kind of method the number of rejected, subsequent frames is easily found out directly from the state machine, based upon the lowest state of the rejected frames substituting procedure which has been visited. Thus the above presented detection of the quality of an information transfer connection can also be applied in such a way that when P controls the detection, the lowest state of the rejected frames substituting procedure is used, which has been visited during the monitoring slot. Depending on the substituting procedure, P is then no longer directly the number of subsequent rejected frames, but it describes more generally how difficult the substituting of each rejected speech frame has been estimated to be in the rejected frames substituting procedure. For example U.S. Pat. No. 5,526,366 "Speech Code Processing" describes a method in which the state machine has been modified in such a way that the lowest state of the rejected frames substituting procedure can also be moved into as a result of a single bad frame, if this individual frame has been received after just one or only a few good frames.

Figure 3:
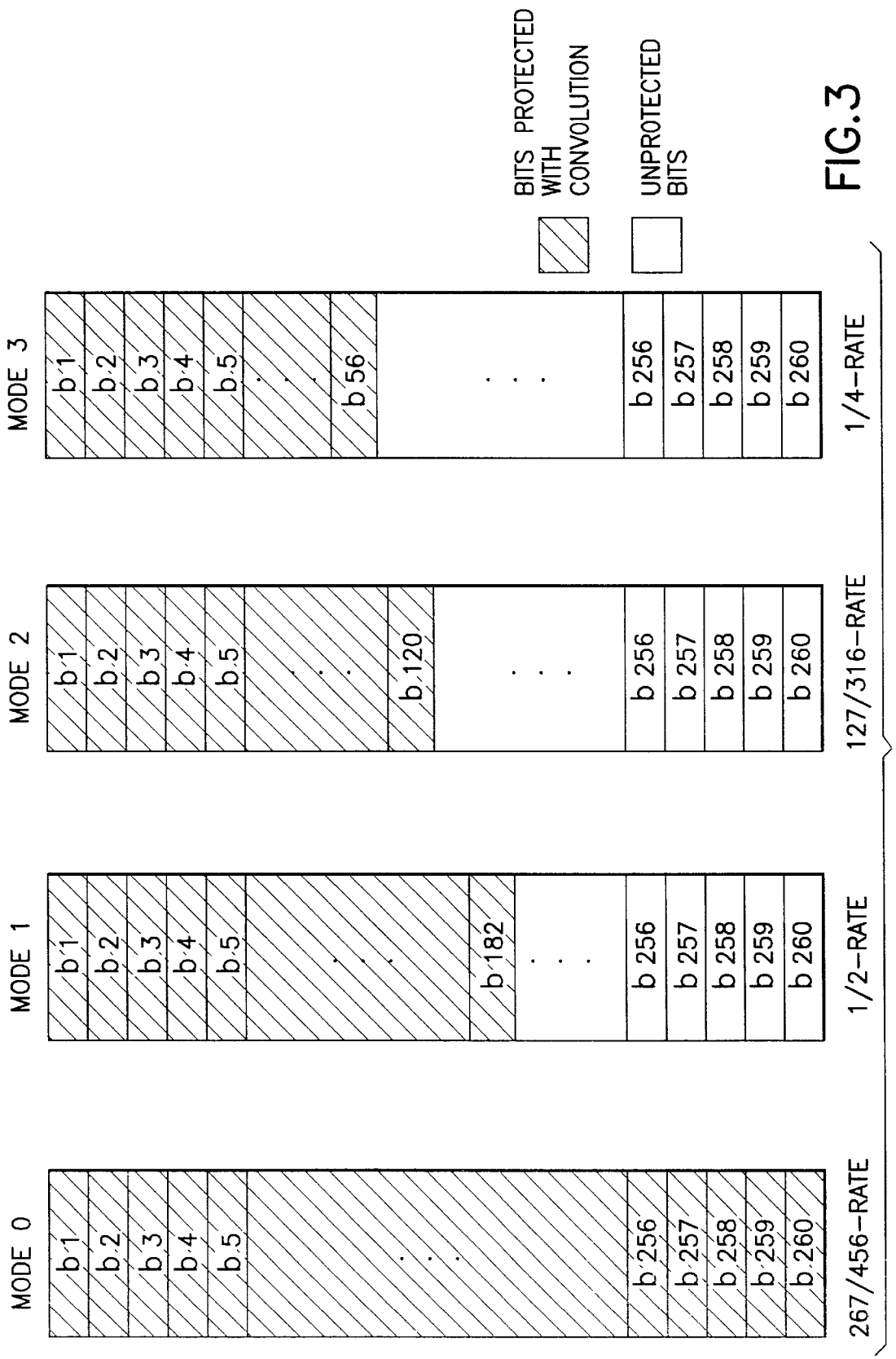
FIG. 3 presents the focusing of error correction coding on speech parameter bits in relation to the efficiency of the error correction coding used in a speech coding system according to the invention.

FIG. 3 presents the separation of speech parameter into protected bits by convolution coding and unprotected bits in four operating modes used in the example of the speech encoding system according to the invention. In different embodiments there can also be more or fewer than four operating modes. The bits protected with convolution coding are shown darkened in FIG. 3. One of these four modes is used for each 20 ms speech frame. The selecting of the mode is based upon the estimate of the information transfer line error rate, and it is possible to determine the mode individually for each frame. In the receiver the coding mode (focus mode) used for encoding can be identified directly from the received bit stream. Alternatively, it is possible to include the information about the coding mode used in a speech frame as side information bits. Because the information about the coding mode used is the most important information required for decoding, in this case the side information bits must be protected using the most efficient error correction- and error detection algorithm. This naturally reduces the efficiency of the codec to some extent, and thus it is a better solution to identify the coding mode from the received data in a decoder. It is also possible to transfer the coding mode in a signaling channel, if the current information transfer system facilitates it.

Figure 4:
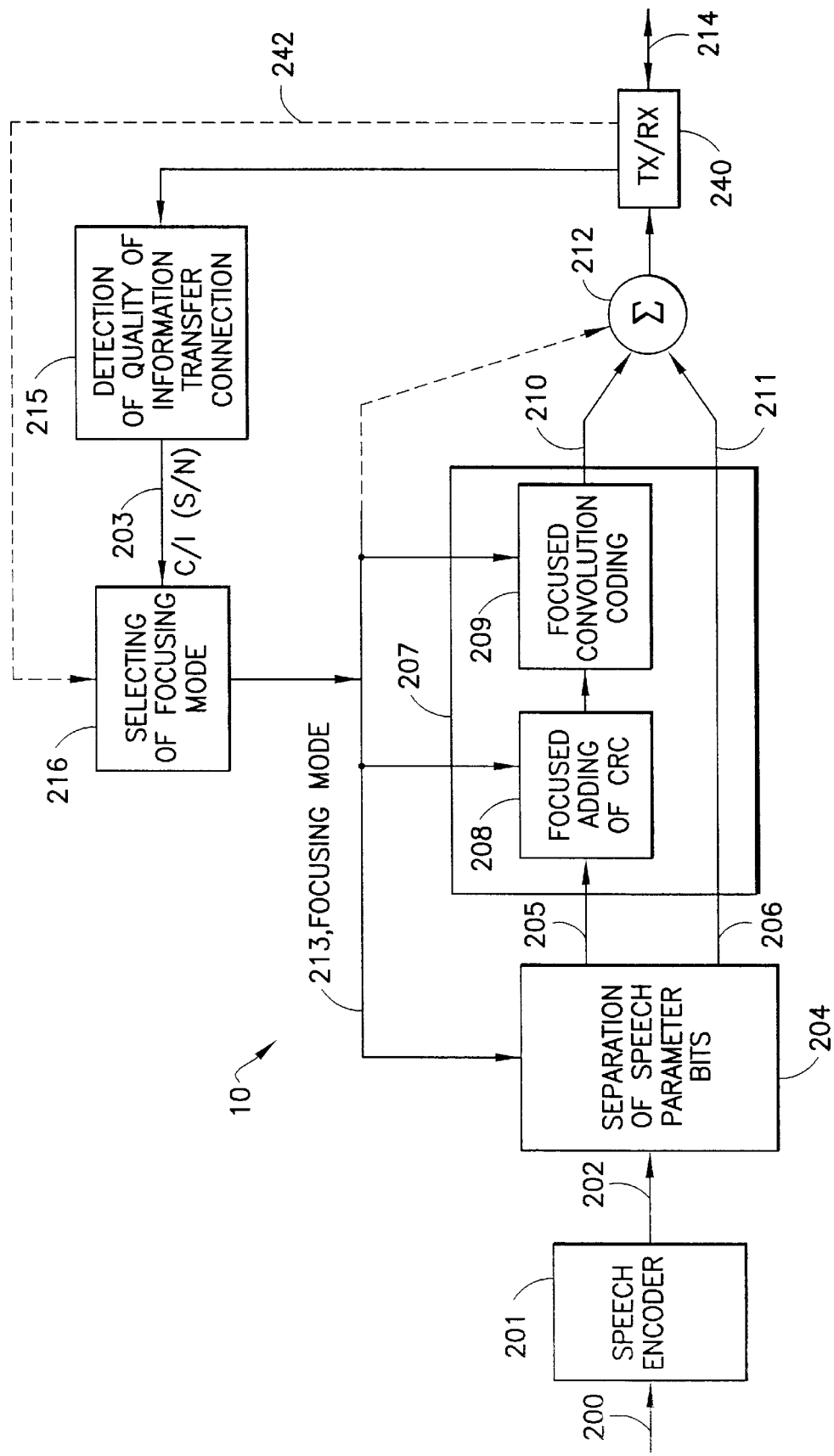
FIG. 4 presents in form of a block diagram a transmitter utilizing the focused error correction and error detection according to the invention.

FIG. 4 presents transmitter section 10 utilizing the focused error correction and error detection according to the invention. In it speech signal 200 is encoded in speech encoder 201, which encodes the speech into speech parameter bits 202 characteristic of the speech encoding algorithm (e.g. RPE-LTP-coding). Error correction and error detection are focused according to the invention on speech parameter bits 202 as a function of the quality of the information transfer connection. The quality of the information transfer connection is continuously monitored. The monitoring is carried out e.g. using detector 215, which measures the C/I-ratio of the information transfer connection (alternatively, it would be possible to use e.g. S/N-ratio or bit error ratio (BER)). The measured C/I-ratio 203 is transferred to focusing mode selector 216, which selects encoding mode 213 to be used for speech encoding according to the principle mentioned in connection with the explanation of FIGS. 2 and 3. The quality of the signal receiver from information transfer connection 214 can thus be analyzed based upon e.g. S/N, C/I or bit error ratio (BER). These parameters are typically formed in the channel equaliser block of a receiver. The estimating of Signal-to-Noise ratio and bit error ratio has been presented e.g. in U.S. Pat. No. 5,557,639.

In two-way information traffic a significant difference may occur in the error rate of an information transfer connection (ref. 214) in different directions (transmitted information, received information). In order to be able to transmit the information to be transmitted according to the method in the best possible focusing mode, such an embodiment can be used in the method, in which the detection of the quality of transfer channel 214 is performed in receiver 20 (FIG. 5) and receiver 20 steers transmitter 10 to the best possible focusing mode. In this case the detection of the quality of transfer channel 214 and the selecting of the focusing mode are performed in receiver 20. Receiver 20 transmits the selected focusing mode as side information to transmitter 10, which changes to use the selected focusing mode. In this way transmitter 10 does not need to perform the detection of the quality of transfer channel 214 and the selecting of the focusing mode. This embodiment is described in more detail below.

Speech parameter bits 202 produced by speech encoder 201 (FIG. 4) are directed to speech parameter bit separator 204, in which they are divided into two parts: into bits 205 to be protected using an error correction- and error detection code, and bits 206 (if any) which are transmitted unprotected over the information transfer connection. In the information coding system according to the invention it is also possible to use the error correction- and error detection codes independently of each other, in other words to use only either error correction coding or only error detection coding. However, the simultaneous use of both coding methods gives the best result in voice quality. The focused error correction coding (e.g. convolution coding 209) and error detection coding (e.g. CRC-coding 208) according to the invention are performed in channel encoder 207. Output 210 of convolution encoder 209 and speech parameter bits 211 to be transferred without error coding (modes 1 to 3, FIG. 3) are combined using multiplexer 212 in order to form channel encoded signal 214 to be transmitted to the information transfer connection. The signal is transmitted to the information transfer connection using transceiver unit 240. When mode 0 is used, all speech parameter bits are protected, in which case speech parameter bit separation 204 and multiplexing 212 need not be performed, but all speech parameter bits pass through error correction coding 209 and error detection coding 208.

In connection with FIGS. 2 and 3 it was mainly the focusing of error correction coding on certain speech parameter bits that was described. In a corresponding way it is possible to focus the coding (e.g. CRC-coding 208) used for the detection of transfer errors on selected bits. This further increases the probability of the most important bits reaching their target. In this way the need to mute the speech synthesizing in a receiver does not arise as frequently as in prior art systems, because it is possible to decode a larger share of the speech frames than previously.

Figure 6:
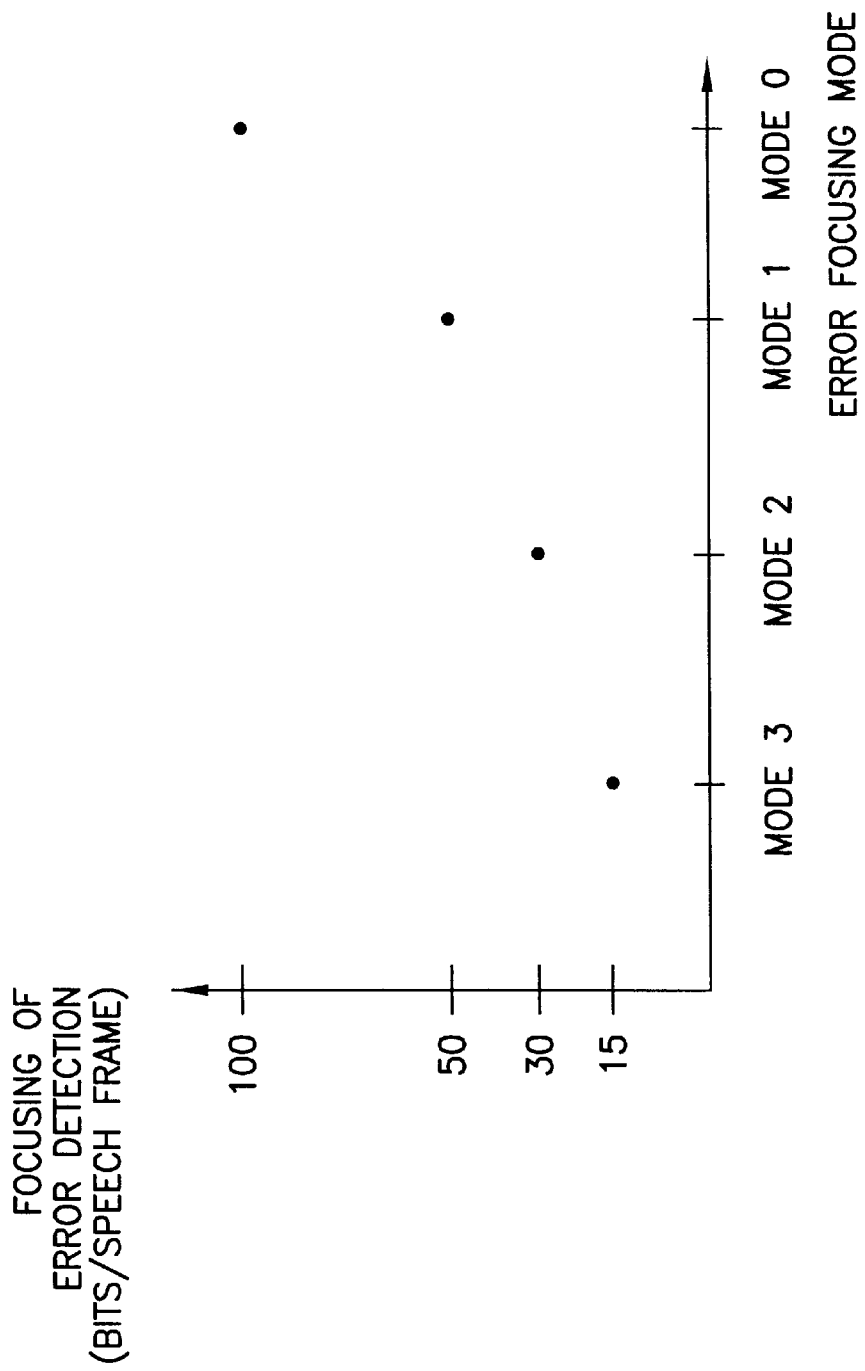
FIG. 6 presents the focusing of the focused error detection according to the invention on speech parameter bits as a function of an error detection mode.

On almost error-free channels (C/I>10 dB) CRC-coding 208 is focused in the above described case on the 100 most important bits, while on low error ratio (7 dB<C/I≦10 dB), medium error ratio (4 dB<C/I≦7 dB) and high error ratio (C/I≦4 dB) channels CRC 208 only covers the 50, 30 and 15 most important bits respectively. FIG. 6 presents the focusing of CRC-coding 208 on certain bits as a function of focusing mode 213.

Figure 5:
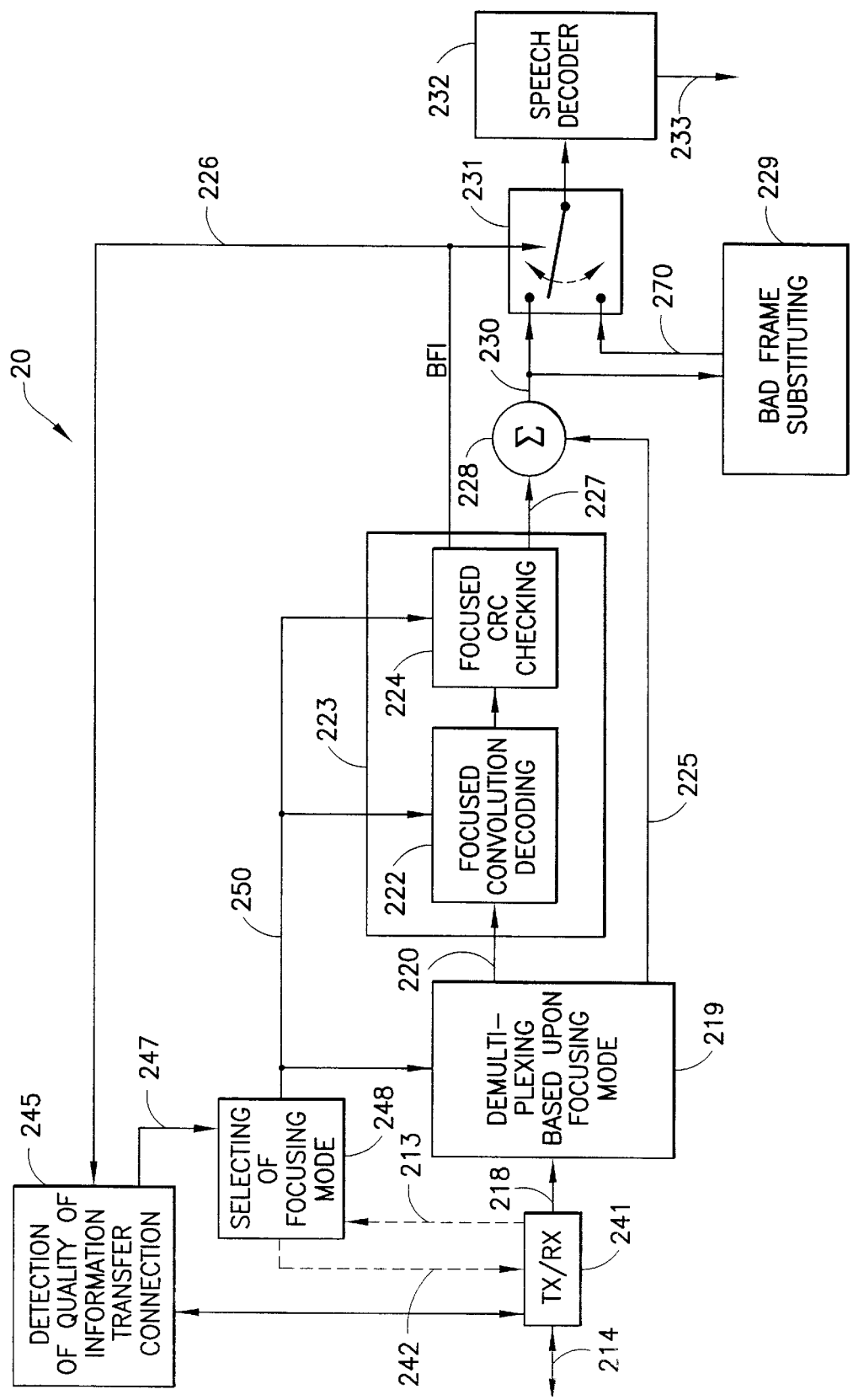
FIG. 5 presents in form of a block diagram a receiver utilizing the focused error correction and error detection according to the invention.

FIG. 5 presents as a block diagram the structure of receiver 20 used in the information coding system according to the invention. The data received from information transfer connection 214 is directed from transceiver unit 241 to demultiplexer 219, in which it is decoded using the method (e.g. FIG. 3, modes 0 to 3) determined by the focusing mode used. The focusing mode to be used is received from transmitter 10 e.g. as side information bits (ref. 213) and transferred to focusing mode selector 248. Focusing mode selector 248 of receiver 20 also can make the decision on the focusing mode suited for information transfer connection 214 by measuring the quality of information transfer connection 214 using detector 245. Detector 245 can measure the quality of an information transfer connection also based upon rejected packets, as stated earlier. This is represented by signal 226 from CRC checking block 224. The measuring result is transferred to focusing mode selector 248 in the form of signal 247. If the selecting of focusing mode is performed in receiver 20, the information about it is transferred by the receiver to transmitter 10 for example as side information bits. This is represented by dashed line 242.

When focusing mode selector 248 has determined focusing mode 250 to be used, it transfers focusing mode 250 to channel decoder 223. If receiver 20 is capable of recognizing the focusing mode to be used without side information bits 213, the speech decoder preferably makes the decision on the focusing mode to be used in connection with the decoding. Independent of the way in which the focusing mode has been transferred or identified, received data 218 is divided into unprotected bits 225 and bits 220 protected with both error correction code 209 (FIG. 4) and error detection code 208 (FIG. 4) based upon the focusing mode. If information transfer connection 214 is almost error-free (mode 0 was selected for the focusing mode), no bit separation needs to be carried out, because all bits have been protected.

Out of data 220 to be transferred from demultiplexer 219 to channel decoder 223, first the error correction coding is removed. This is realized using convolution decoder 222 according to an algorithm determined based upon focusing mode 250. In convolution decoder 222 the same convolution coding ratio (267/456, ½, 127/316 or ¼) is used as in transmitter 10. After this the data is directed to CRC checking block 224, which checks from the data it has received whether the bits subjected to the focused error detection coding comprise such errors which convolution decoder 222 was not capable of correcting. The CRC-checking is in this case focused on the 100, 50, 30 or 15 most important bits in the way determined by focusing mode 250. CRC checking block 224 provides as its output decoded speech parameters 227 and bad frame indication signal 226.

If CRC checking block 224 did not detect any errors among the bits subjected to the error detection coding, decoded speech parameter bits 227 and unprotected bits 225 are combined in multiplexer 228 into one whole speech frame 230, which is further directed to speech decoder 232 for speech synthesizing. If CRC checking block 224 detects an error among the CRC-protected speech parameter bits, it activates bad frame indication signal 226, in which case the frame 230 in question is not used for speech synthesizing.

Instead, based upon error-free frames received earlier from multiplexer 228, bad frame substituting unit 229 generates an estimate and transfers it to speech decoder 232. Bad frame indication signal 226 controls switch 231, which performs the selection between decoded speech parameter frame 230 and frame 270 substituting for the bad frame. Bad frame indication signal 226 is also directed to information transfer connection quality detector 245 of the receiver 20.

The same speech encoder 201 and the same speech decoder 232 are used at all times in the information coding method according to the invention utilizing focused error correction and error detection. Also the speech coding rate is maintained as constant. Only the mode of error correction coding 209 and/or error detection coding 208 is optimized based upon the quality of information transfer connection 214 in order to obtain the best possible speech quality. Nothing, however prevents the use of the invention in speech coding systems operating at variable line speed. Equally, the invention is excellently suited for use in connection with such fixed line speed speech coding systems, in which several speech codecs operating at different line speeds are used. In these systems the proportional share of error correction bits and/or error detection bits of speech parameters is adjusted based upon the quality of the information transfer connection, while the total line speed remains constant. In these systems it is possible to use the focused error correction and -detection according to the invention as an additional feature: first the ratio between speech parameter bits and error correction/detection bits is selected in the system, after which a focusing mode is selected individually for each line speed used for error correction and/or error detection. Also in these systems it is possible to achieve in a speech coding system a better speech quality by using the focused error correction and error detection according to the invention, especially on information transfer connections with poor error rate.

Figure 7:
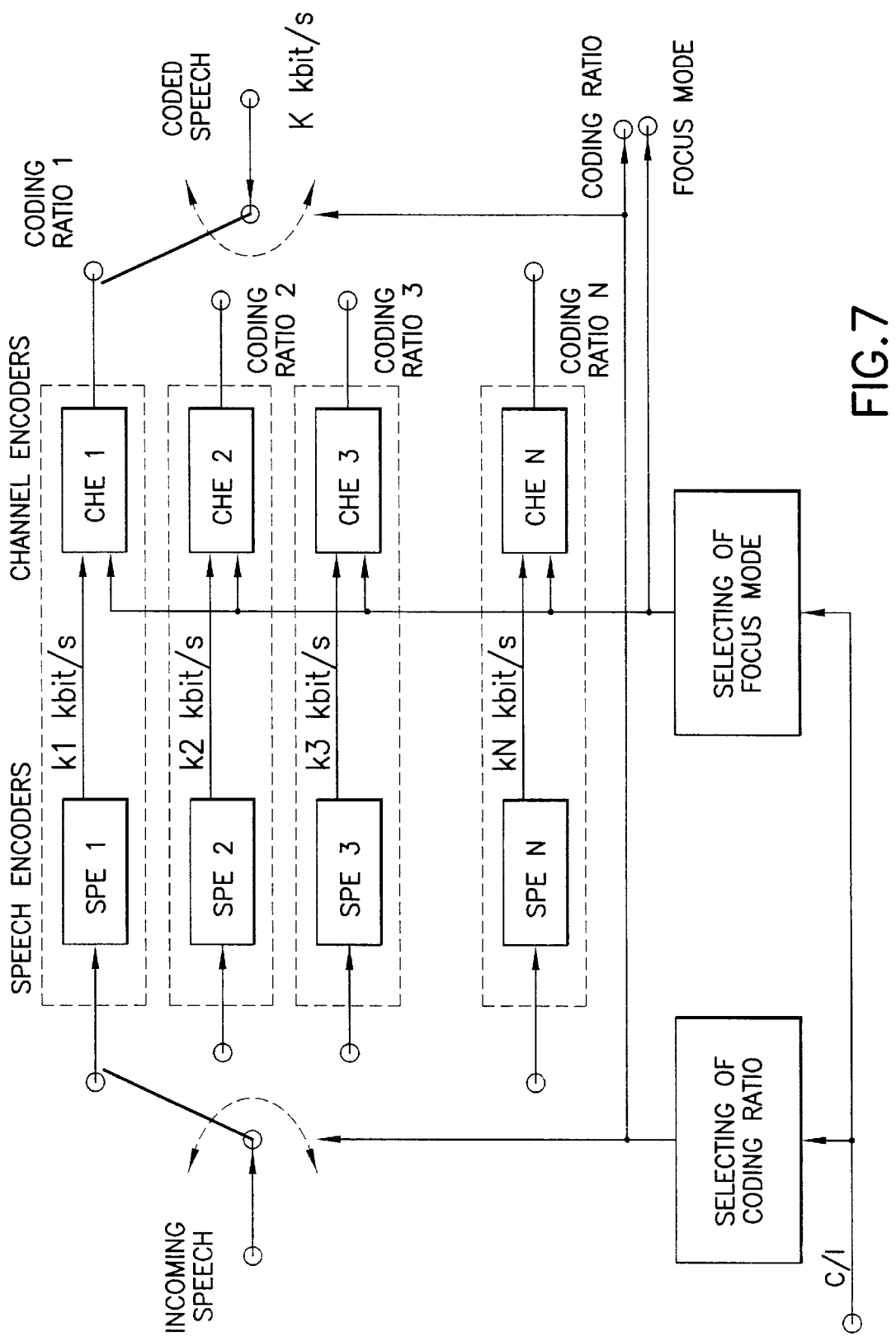
FIGS. 7 and 8 present the realization of the focused error correction and error detection according to the invention in connection with a speech coder using several speech codecs with different bit rates.

FIG. 7 presents a fixed line speed speech coding system encoder comprising N speech encoders SPE1, SPE2, ..., SPEN operating at different line speeds. Each of them produces a different speech encoding bit rate k1, k2, ... kN. Each speech encoder SPE1, SPE2, ... ,SPEN is connected to one of N channel encoders CHE1, CHE2, ..., CHEN. Each N channel encoder CHE1, CHE2, ..., CHEN also has a different total bit rate c1, c2, ..., cN (not shown in the figure) used as total for error correction and -detection. The bit rates of the speech encoders and the channel encoders are such that k1>k2> ... >kN and c1<c2< ... <cN. Total bit rate K of the encoded information supplied to the information transfer channel is constant for the system. This has been achieved by using such bit rates for speech encoders SPE1, SPE2, ..., SPEN and channel encoders CHE1, CHE2, ..., CHEN which make the following equation: ki+ci=K, i=1, ..., N true. Accordingly only the proportional share of the bit rates used by the speech encoders and the channel encoders changes, while total line speed K remains constant. The proportional share of the bit rates is adjusted based upon the quality of the information transfer connection: the more transfer errors occur in the information transfer connection, the lower the bit rate speech encoder and correspondingly the higher the bit rate channel encoder (more bits are used for error correction and -detection) are used. The above speech encoding system is known to a person skilled in the art.

Figure 8:
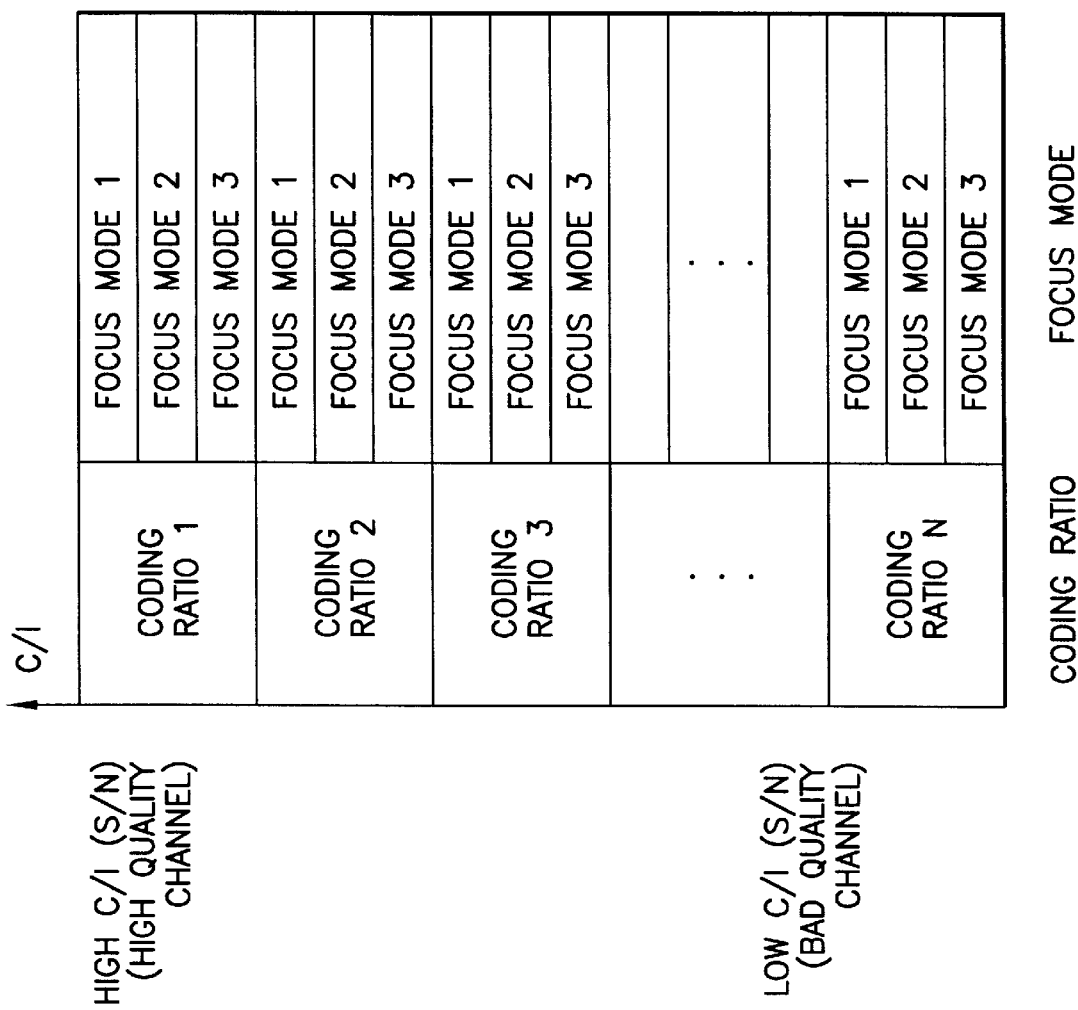

When the focused error correction and -detection according to the invention is applied to the above described speech encoding system, it is realized individually for each N (or for some of them) coding mode (a combination of speech encoder and a channel encoder). In this way there are a number of focusing modes according to the invention for each N coding mode (or for part of them). The more erroneous an information transfer channel is, the higher the focus mode number that is selected (FIG. 8). In other words, more error correction and -detection is focused on the bits most important for speech quality.

Using the focused error correction and/or error detection according to the invention offers additional flexibility to adapt to information transfer channels of varying quality, and results in a better speech quality on information transfer connections with interference. The invention provides a new parameter for the adjusting of the focusing of error correction and detection, in which case the accuracy and efficiency achieved are better than in prior art systems. The invention offers an excellent way to realize a speech coding system operating from the error correction and -detection point of view in several different operating modes, which system preferably uses only a small number of different speech codecs. The arrangement according to the invention facilitates the realization of a speech coding system operating in several different operating modes, highly tolerant of transfer errors, using a low number of speech codecs, the total complexity of the system remaining on a low level. In this way the different embodiments of the invention are economically competitive.

FIG. 8 presents how different focus modes (in this example 1 to 3) are focused on each different coding ratio 1, 2, 3, ..., N as a function of the quality of the information transfer connection (in the figure presented as the C/I-ratio). The coding ratio means the proportion of speech parameter bits to error correction and/or -detection bits in a speech coding system, operating at a constant line speed.

Figure 9:
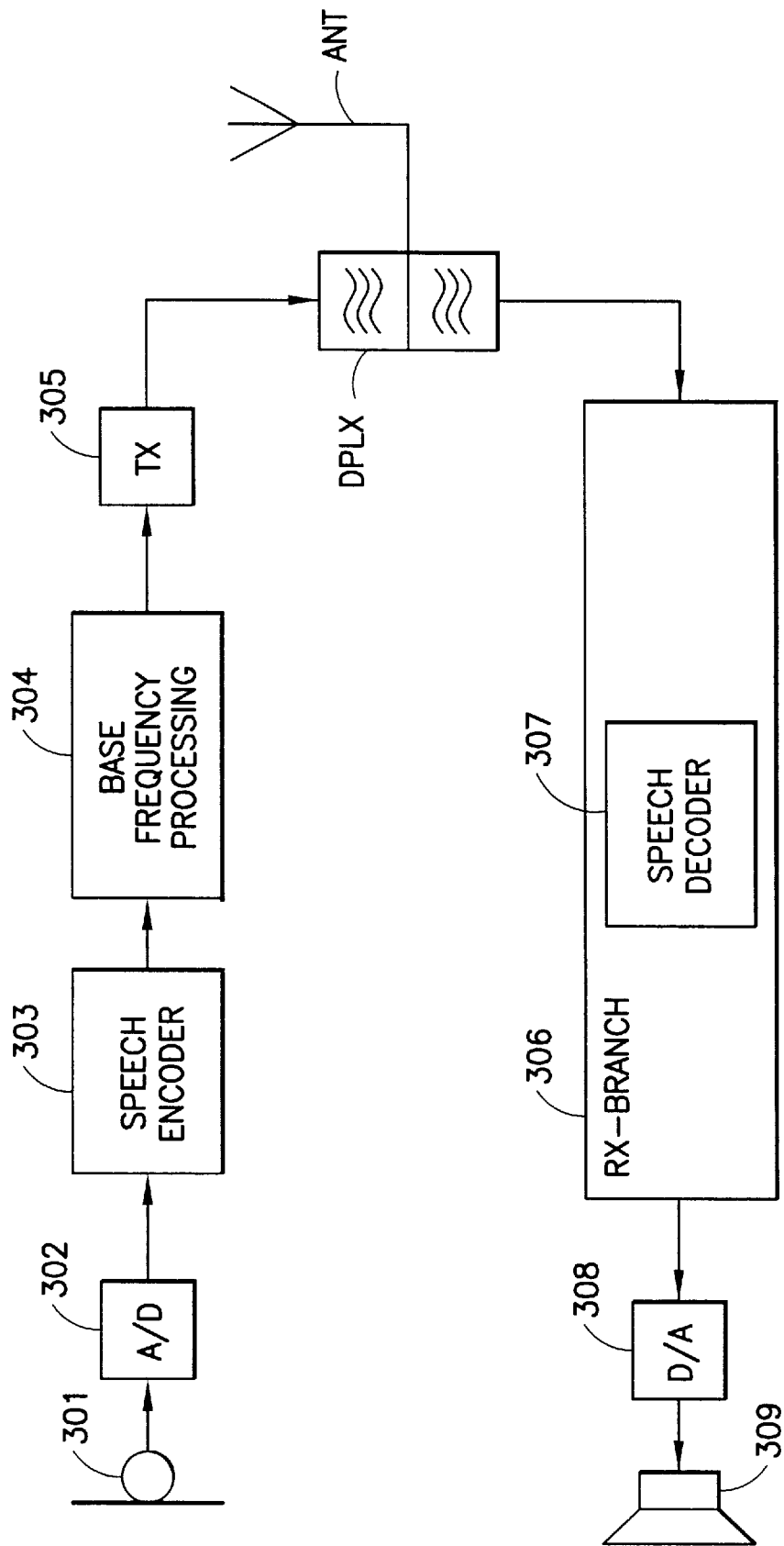
FIG. 9 presents the structure of a mobile station according to the invention as a block diagram.

FIG. 9 presents as a block diagram the structure of a mobile station according to the invention, in which mobile station the focused error correction and detection according to the invention is used. The speech signal to be transmitted, obtained from microphone 301, is sampled in A/D-converter 302, and the speech is encoded in speech encoder 303, after which the processing of the base frequency signal is performed in block 304, essentially channel coding 207 (FIG. 4) according to the invention performing error correction and detection. After this the channel coded signal is converted to radio frequency and transmitted from transmitter 305 through duplex-filter DPLX and antenna ANT. At reception the speech received is subjected to the functions of reception branch 306 explained in connection with FIG. 5, such as speech decoding using focusing mode 213, 213' according to the invention in block 223. The decoded speech is directed through D/A-converter 308 to loudspeaker 309 for reproduction.

Figure 10:
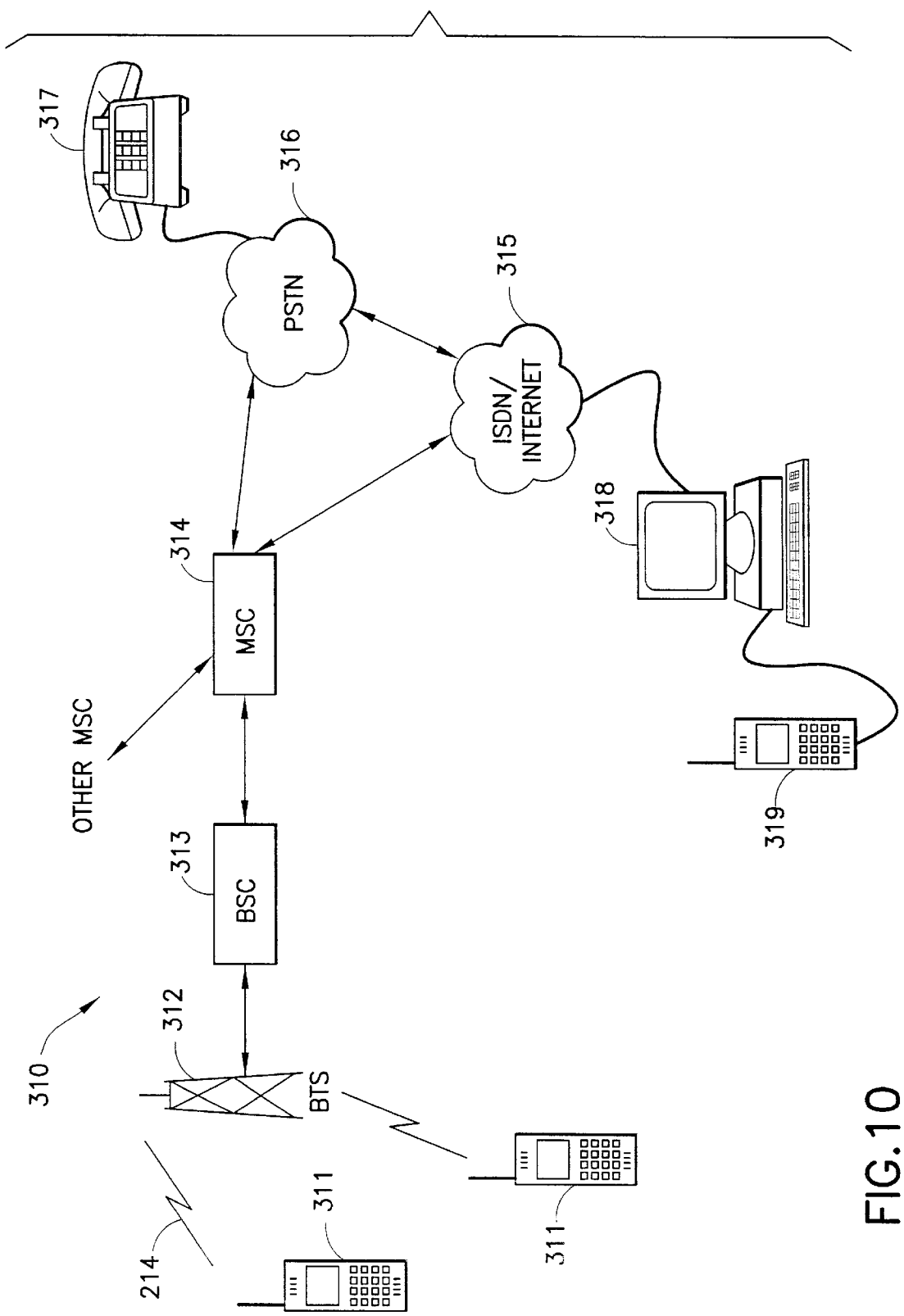
FIG. 10 presents an information transfer system according to the invention.

FIG. 10 presents information transfer system 310 according to the invention, which system comprises mobile stations 311, 311', base station 312 (BTS, Base Transceiver Station), base station controller 313 (BSC, Base Station Controller), mobile switching center 314 (MSC, Mobile Switching Center), telecommunication networks 315 and 316, and user terminals 317 and 319 connected to them either directly or over a terminal device (e.g. computer 318). In information transfer system 310 according to the invention the mobile stations and other user terminals 317, 318 and 319 are connected to each other over telecommunication networks 315 and 316, and they use for information transfer the information coding method described in connection with FIGS. 2 to 9. The method according to the invention is used in the system preferably in mobile stations 311, 311' and base station 312.

The above is a description of the realization of the invention and its embodiments utilizing examples. It is self evident to a person skilled in the art that the invention is not limited to the details of the above presented examples and that the invention can be realized also in other embodiments without deviating from the characteristics of the invention. The presented embodiments should be regarded as illustrating but not limiting. Thus the possibilities to realize and use the invention are limited only by the enclosed claims. Thus different embodiments of the invention specified by the claims, also equivalent embodiments, are included in the scope of the invention.

What is claimed is:

1. A digital information transfer system, which comprises a transmitter and a receiver and an information transfer connection between said transmitter and receiver, said transmitter and receiver having means for processing of information and for transferring said information from said transmitter to said receiver using said information transfer connection, said transmitter having a channel encoder for processing the information, said information processing means having first dividing means for dividing the information into at least two parts, a first part and a second part, and that on said first part of said information, in said channel encoder, one of the following operations is performed: a) error correction coding for the correction of transfer errors occurring on the information transfer connection found at reception, b) error detection coding for the detection of transfer errors occurring on the information transfer connection found at reception, and a combination of a) and b), and further comprising:

means for analyzing the quality of said information transfer connection and for yielding a response describing the quality, said transmitter arranged to adjust the ratio between said first information and said second information parts based upon the response received from said information transfer connection quality analysis means;

wherein said transmitter comprises several speech encoders arranged to encode the incoming information at several different line speeds in order to form speech parameters, and several channel encoders arranged to add channel codes in connection with the speech parameters, the division of the information into said first part and second part based upon the response formed by said information transfer connection quality analyzing means arranged to be formed separately for each speech codec formed jointly by a speech encoder an a channel encoder;

wherein said channel encoder is arranged to perform error correction coding to all of said first part for correction of transfer errors occurring on the information transfer connection found at reception;

said channel encoder further comprises second dividing means for dividing said first part into two subdivisions, a first subdivision and a second subdivision; and said channel encoder comprises means for adding an error detection code in connection with the information of said first subdivision.

2. A digital information transfer system, which comprises:
a transmitter;
a receiver;
an information transfer connection between said transmitter and receiver; wherein:

said transmitter and receiver comprise means for processing of information and for transferring it from said transmitter to said receiver using said information transfer connection;

said transmitter comprises a channel encoder for processing the information;

said information processing means comprise first dividing means for dividing the information into at least two parts, a first part having a first amount of information and a second part having a second amount of information;

said system further comprises means for analyzing quality of said information transfer connection and for yielding a response describing the quality; and said transmitter being arranged to receive said response, wherein:

said channel encoder is arranged to perform error detection coding to said first part for the detection of transfer errors occurring on the information transfer connection found at reception;

said transmitter is arranged to adjust a ratio between said first amount and said second amount based upon said response for focusing of said error detection coding;

wherein said channel encoder is arranged to perform error correction coding to all of said first part for correction of transfer errors occurring on the information transfer connection found at reception;

said channel encoder further comprises second dividing means for dividing said first part into two subdivisions, a first subdivision and a second subdivision; and said channel encoder comprises means for adding an error detection code in connection with the information of said first subdivision.

3. An information transfer system according to claim 2, wherein said channel encoder comprises second dividing means for dividing said first part into two subdivisions, a first subdivision and a second subdivision; and said channel encoder comprises means for adding an error correction code in connection with the information of said first subdivision.

4. An information transfer system according to claim 2, wherein said second dividing means is arranged to divide said first part into said two subdivisions based upon said response.

5. An information transfer system according to claim 2, wherein said means for analyzing the quality of the information transfer connection comprises a detector for detecting the quality of the information transfer connection in said transmitter in order to form said response.

6. An information transfer system according to claim 5 further comprising a focusing mode selector, arranged to select, based upon said response, a focusing mode to be used for encoding the information.

7. An information transfer system according to claim 2, wherein said means for analyzing the quality of the information transfer connection comprise a detector for detecting the quality of the information transfer connection in said receiver in order to form said response.

8. An information transfer system according to claim 7, wherein said receiver further comprises means for detecting bad speech frames; and said detector comprises means for analyzing the quality of the information transfer connection and for forming said response based upon the detected bad speech frames.

9. An information transfer system according to claim 2, wherein said transmitter comprises several speech encoders which have been arranged to encode the incoming information at several different line speeds in order to form speech parameters; said transmitter further comprises several channel encoders, which have been arranged to add channel codes in connection with the speech parameters; and the division of the information into said first part and second part based upon the response formed by said information transfer connection quality analyzing means is formed separately for each speech codec, formed jointly by a speech encoder and a channel encoder.

10. A mobile station comprising:
a means for processing the information; and
a transmitter comprising a channel encoder for processing the information;
wherein said information processing means comprise first dividing means for dividing the information into at least two parts, a first part having a first amount of information and a second part having a second amount of information, wherein;
said channel encoder is arranged to perform error detection coding to said first part for the detection at reception of transfer errors occurring in the information transfer connection; and
said mobile station comprises means for receiving quality information describing the quality of said information transfer connection, and for adjusting a ratio between said first amount and said second amount based upon said quality information;
wherein said channel encoder is arranged to perform error correction coding to all of said first part for correction of transfer errors occurring on the information transfer connection found at reception;
said channel encoder further comprises second dividing means for dividing said first part into two subdivisions, a first subdivision and second subdivision; and
said channel encoder comprises means for adding an error detection code in connection with the information of said first subdivision.

11. A transmitting and receiving unit comprising:
a means for processing information; and
a transmitter comprising a channel encoder for processing the information;
wherein said information processing means comprise first dividing means for dividing the information into at least two parts, a first part having a first amount of information and a second part having a second amount of the information; wherein;
said channel encoder is arranged to perform error detection coding to said first part for the detection at reception of transfer error occurring in the information transfer connection;
said transmitting and receiving unit have means for receiving quality information describing the quality of said information transfer connection, and for adjusting a ratio between said first amount and said second amount based upon said quality information;
wherein said channel encoder is arranged to perform error correction coding to all of said first part for correction of transfer errors occurring on the information transfer connection found at reception;
said channel encoder further comprises second dividing means for dividing said first part into two subdivisions, a first subdivision and a second subdivision; and
said channel encoder comprises means for adding an error detection code in connection with the information of said first subdivision.

12. A transmitter comprising:
a means for processing information; and
a transmitter comprising a channel encoder for processing the information;
wherein said information processing means comprise first dividing means for dividing the information into at least two parts, a first part having a first amount of information and a second part having a second amount of information, wherein:
said channel encoder is arranged to perform error detection coding to said first part for the detection at reception of transfer errors occurring in the information transfer connection;
said transmitter has means for receiving quality information describing the quality of said information transfer connection, and for adjusting a ratio between said first amount and said second amount based upon said quality information;
wherein said channel encoder is arranged to perform error correction coding to all of said first part for correction of transfer errors occurring on the information transfer connection found at reception;
said channel encoder further comprises second dividing means for dividing said first part into two subdivisions, a first subdivision and a second subdivision; and
said channel encoder comprises means for adding an error detection code in connection with the information of said first subdivision.

13. A method for transferring information in a digital information transfer system, in which
the information to be transferred is divided for transmission into at least two parts, a first part having a first amount of information and a second part having a second amount of information; and
quality of an information transfer connection is analyzed in order to form an analysis result,
comprising the steps of:
performing an error detection encoding operation on the first part of said information; and
adjusting a ratio between said first amount and said second amount based upon said analysis result;
wherein said channel encoding is arranged to perform error correction coding to all of said first part for correction of transfer error occurring on the information transfer connection found at reception;
said channel encoding further comprises second dividing said first part into two subdivisions, a first subdivision and a second subdivision; and
said channel encoding comprises adding an error detection code in connection with the information of said first subdivision.

14. A method according to claim 13, wherein:
said analysis is performed in a receiver; and
said analysis result is transferred from the receiver to a transmitter.

15. A method according to claim 13, wherein said analysis result describing the quality of the information transfer connection is obtained using at least one of the following measuring operations:
measuring the number of speech parameter frames rejected in a certain time unit at speech synthesizing; and
measuring the number of subsequent speech parameter frames rejected at speech synthesizing;

detection of a signal to noise level of the information transfer connection;

detection of a carrier to interference ratio of the information transfer connection;

detection of a bit error rate for the information transfer connection;

detection of the amount of data transfer errors for the information transfer connection; and detection of the frequency of data transfer errors for the information transfer connection.

16. A digital information transfer system, which comprises:

a transmitter;

a receiver;

an information transfer connection between said transmitter and receiver; wherein:

said transmitter and receiver comprise means for processing of information and for transferring it from said transmitter to said receiver using said information transfer connection;

said transmitter comprises a channel encoder for processing the information;

said information processing means comprise first dividing means for dividing the information into at least two parts, a first part and a second part;

said system further comprises means for analyzing quality of said information transfer connection and for yielding a response describing the quality; and said transmitter being arranged to receive said response, wherein:

said channel encoder is arranged to perform error detection coding to said first part for the detection of transfer errors occurring on the information transfer connection found at reception;

said transmitter is arranged to adjust a ratio between said first part and said second part based upon said response for focusing of said error detection coding; and wherein said transmitter comprises several speech encoders which have been arranged to encode the incoming information at several different line speeds in order to form speech parameters and several channel encoders, which have been arranged to add channel codes in connection with the speech parameters; and the division of the information into said first part and second part based upon the response formed by said information transfer connection quality analyzing means is formed separately for each speech codec, formed jointly by a speech encoder and a channel encoder;

wherein said channel encoder is arranged to perform error correction coding to all of said first part for correction of transfer errors occurring on the information transfer connection found at reception;

said channel encoder further comprises second dividing means for dividing said first part into two subdivisions, a first subdivision and a second subdivision; and said channel encoder comprises means for adding an error detection code in connection with the information of said first subdivision.

\* \* \* \* \*